United States Patent [19]

Krude

[11] Patent Number: 4,549,873
[45] Date of Patent: * Oct. 29, 1985

[54] ANGULARLY MOVABLE UNIVERSAL JOINT

[75] Inventor: Werner Krude, Siegburg-Kaldauen, Fed. Rep. of Germany

[73] Assignee: Uni-Cardan Aktiengesellschaft, Siegburg, Fed. Rep. of Germany

[*] Notice: The portion of the term of this patent subsequent to Jan. 10, 2001 has been disclaimed.

[21] Appl. No.: 593,194

[22] Filed: Mar. 27, 1984

Related U.S. Application Data

[63] Continuation of Ser. No. 329,330, Dec. 10, 1981, abandoned.

[30] Foreign Application Priority Data

Dec. 20, 1980 [DE] Fed. Rep. of Germany ....... 3048339

[51] Int. Cl.$^4$ .............................................. F16D 3/24
[52] U.S. Cl. .................................... 464/141; 464/139
[58] Field of Search ................. 403/57; 464/139, 141, 464/145, 906, 146

[56] References Cited

U.S. PATENT DOCUMENTS

| | | | |
|---|---|---|---|
| 1,376,437 | 5/1921 | Hood | 464/141 |
| 2,879,651 | 3/1959 | Leto et al. | 464/139 |
| 3,802,221 | 4/1974 | Kimata | 464/141 |
| 4,078,400 | 3/1978 | Krude | 464/145 |
| 4,156,354 | 5/1979 | Krude | 464/141 |
| 4,425,101 | 1/1984 | Krude | 464/141 X |

FOREIGN PATENT DOCUMENTS

| | | | |
|---|---|---|---|
| 1185868 | 1/1965 | Fed. Rep. of Germany | 464/141 |
| 1218118 | 5/1960 | France | 464/141 |
| 1436009 | 3/1966 | France | 403/57 |
| 379207 | 8/1964 | Switzerland | 464/141 |

Primary Examiner—Stuart S. Levy
Assistant Examiner—Daniel P. Stodola
Attorney, Agent, or Firm—Toren, McGeady, Stanger, Goldberg & Kiel

[57] ABSTRACT

In an angularly movable universal joint, an inner joint member fits into a hollow space within an outer joint member. The surface of the outer joint member within the hollow space contains uniformly circumferentially spaced axially extending grooves. Radially directed openings are located in the inner joint member facing the grooves. At least partly spherically shaped rolling members are placed in the openings and the grooves for transferring torque between the two parts of the universal joint. Adjacent rolling members are arranged so that they contact one another along spherically shaped surfaces. Balls can be used as the rolling members.

1 Claim, 5 Drawing Figures

ANGULARLY MOVABLE UNIVERSAL JOINT

This is a continuation of application Ser. No. 329,330, filed Dec. 10, 1981, now abandoned.

SUMMARY OF THE INVENTION

The present invention is directed to an angularly movable universal joint for transmitting torque between an inner joint member and an outer joint member. Uniformly circumferentially spaced rolling members are radially movably supported in openings in the inner joint member and are guided in axially extending grooves in the outer joint member.

In accordance with the U.S. Pat. No. 4,156,354, rolling members are provided in a similar universal joint and are of at least a partially spherical design and the diameter of the spherical surfaces of the rolling members is such that they support one another in a circle around the joint axis.

In such a universal joint there are cost and production problems if the parts used are not mass-produced.

Therefore, it is the primary object of the present invention to provide an angularly movable universal joint which uses reasonably priced standard parts and has a small rotation diameter while making use of the full torque capacity.

In accordance with the present invention, balls are used as the rolling members.

The advantage of such an arrangement is that it is easy to produce, because standard production rolling members can be used and the openings in the inner joint member which receive the rolling members can be produced with simple tools, since they are geometrically simple bores which can be formed without causing any problems.

An essential feature of the invention is that the diameter of the pitch circle of the balls in the universal joint is equal to the diameter of an individual ball divided by the sine of 180° divided by the number of balls.

The advantage of such an arrangement is that the size of the ball determines both the torque transmitted and the diameter of the pitch circle. By predetermining the diameter of the pitch circle, it is possible to calculate the outer diameter and the rotation diameter of the universal joint. The diameter of the pitch circle is calculated by the following formula:

$$D = \frac{d_k}{\sin \frac{180}{n}}$$

with
D = pitch circle diameter
$d_k$ = ball diameter
n = number of balls

Moreover, in accordance with the present invention, the inner joint member can be constructed in two parts.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
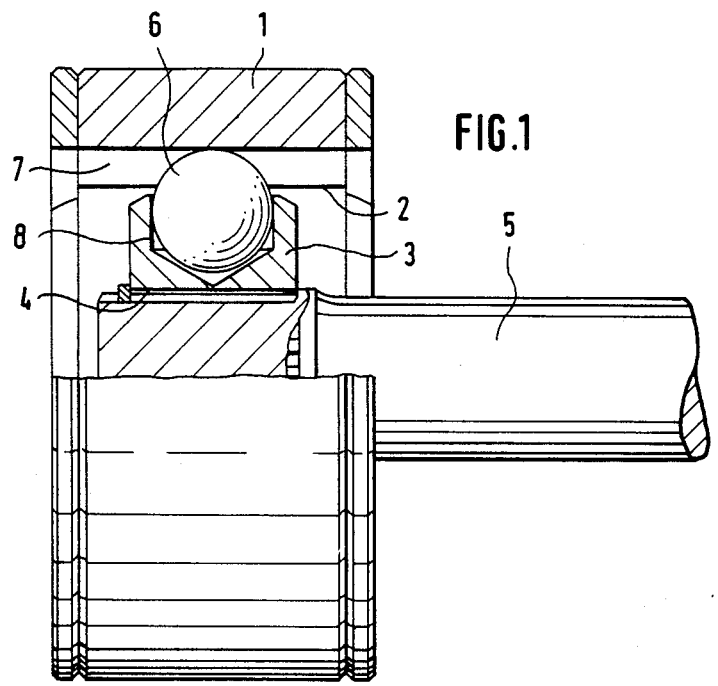
FIG. 1 is a side view, partly in section, of an angularly movable universal joint embodying the present invention.
Figure 2:
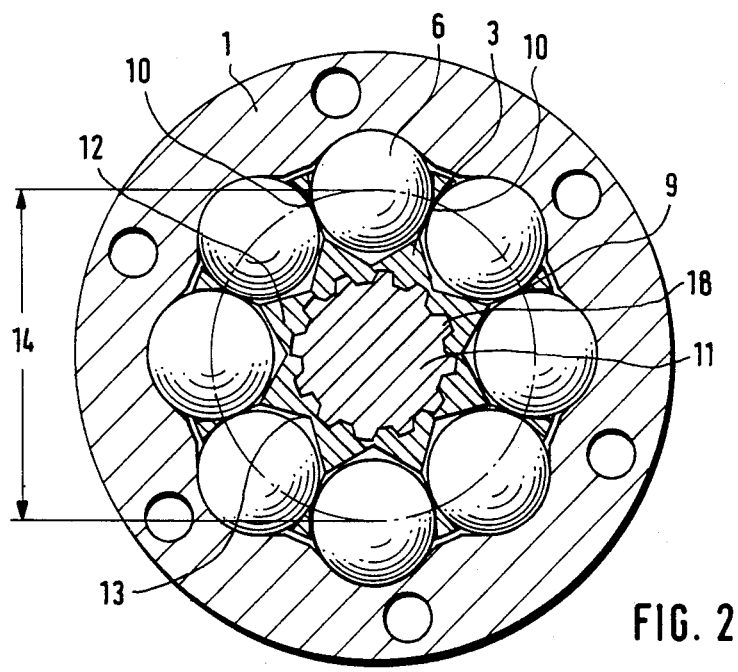
FIG. 2 is a cross-sectional view through the universal joint illustrated in FIG. 1.

In FIGS. 1 and 2 an angularly movable universal joint is illustrated made up of an outer joint member 1 with an interior hollow space 2 into which an inner joint member 3 is fitted. Inner joint member 3 contains a bore 4 in which a shaft 5 is connected so that it rotates with the inner joint member due to a splined interconnection. To transmit torque between the inner and outer joint members rolling members 6 are used in the form of balls.

The balls 6 fit into uniformly circumferentially spaced axially extending grooves in the surface of the outer joint member defining the hollow space and into radially extending openings 8 in the inner joint member 3. In the long direction of the joint, the grooves 7 in the outer joint member 1 extend parallel to the axis of the universal joint. Openings 8 in the inner joint member 3 are in the form of bores with the diameter of the bore corresponding to the diameter of the ball 6. The conically shaped base or run-out in the bore is due to the manner in which it is produced and is of no significance. The balls are held in the openings so that they can be moved radially. The bores or openings are arranged so that openings 9 are provided between adjacent bores whereby the adjacent bores communicate with one another through the openings 9. The openings 9 between two adjacent bores permit the balls 6 to contact one another. As a result, the balls are in mutual supporting contact at points 10, since the balls 6 are arranged in a circle having a diameter 14 and each ball is supported between two adjacent balls and each bore 8 opens laterally through an opening 9 into the adjacent bores. The cross-sectional area 12 extending perpendicularly of the rotational axis 11 of the joint serves to reinforce the inner joint member 3. Cross-sectional area 12 is greater than zero but smaller than the maximum possible theoretical cross-sectional area which would include the hollow spaces 13. Hollow spaces 13 are formed as a result of the manner in which the bores 8 are produced. If the bore 8 terminated in a spherically shaped base with the diameter of the base corresponding to that of the ball 6, the hollow space would not exist and the cross-sectional area 12 would be greater.

Figure 3:
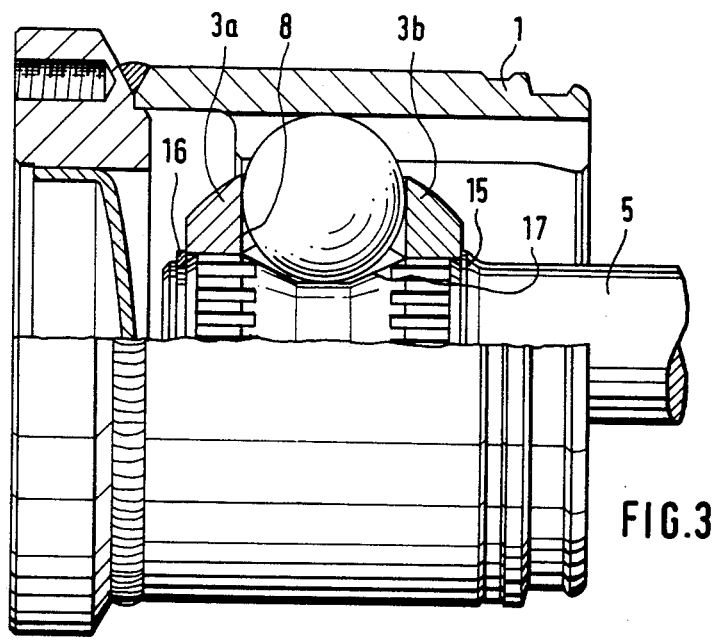
FIG. 3 is a view similar to FIG. 1 illustrating another embodiment of the present invention using a two-part inner joint member.
Figure 4:
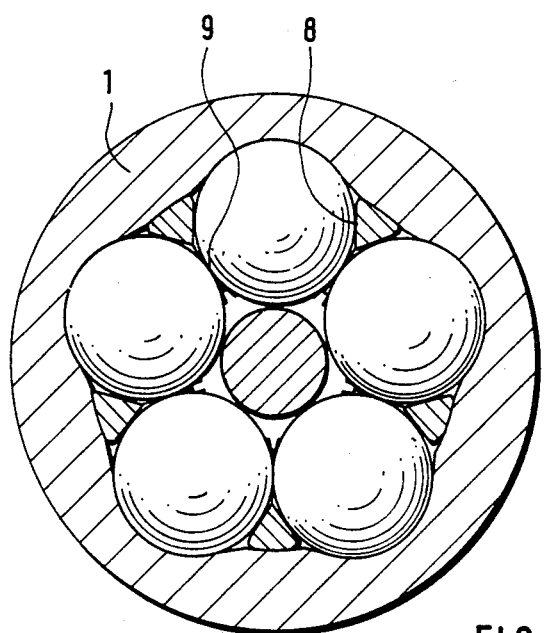
FIG. 4 is a cross-sectional view of the embodiment shown in FIG. 3.

In FIGS. 3 and 4 another universal joint is displayed with inner joint member 3 fitted into outer joint member 1. Inner joint member 3 is made up of two parts 3a and 3b. To secure the separate inner joint member parts 3a, 3b on the shaft 5, a collar 15 is secured in the surface of the shaft and bears against the outer surface of part 3b while a securing ring 16 is held in the shaft 5 and bears against the outside surface of 3a. The parts 3a and 3b are shaped on their facing surfaces to receive the ball-shaped rolling members. After the inner joint member parts 3a, 3b have been assembled on the shaft 5, the opening 8 for the rolling members is formed by the shaped facing surfaces of the parts and the recess or groove 17 formed in the surface of the shaft 5 and located between the two parts. Passages 9 are located between adjacent openings 8 being formed by the inner joint member parts 3a, 3b.

Figure 5:
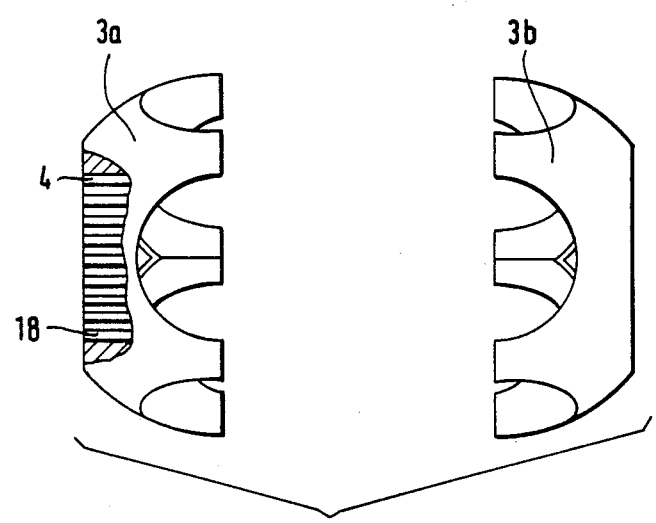
FIG. 5 is a side view, partly in section, of the two part inner joint member shown in FIGS. 3 and 4.

In FIG. 5 the parts 3a, 3b forming the inner joint member 3 are shown spaced axially apart with a bore extending through the parts for receiving the shaft 5 with teeth or splines 18 cut into the bore for connecting the shaft to the inner joint member.

While specific embodiments of the invention have been shown and described in detail to illustrate the application of the inventive principles, it will be understood that the invention may be embodied otherwise without departing from such principles.

I claim:

1. Angularly movable universal joint comprising an outer joint member having a central axis with an annular inner surface encircling the central axis and defining a hollow space therein, an inner joint member located within the hollow space in said outer joint member, said inner joint member having a central axis axially alignable with the central axis of said outer joint member, the inner surface of said outer joint member has uniformly circumferentially spaced axially extending grooves formed therein, said inner joint member has generally radially extending openings therein opening outwardly therefrom toward said outer joint member, each said opening in said inner joint member is aligned opposite one of said grooves in said outer joint member, rolling members each arranged to fit into one of said openings in said inner joint member and extending radially outwardly therefrom into one of said grooves in said outer joint member for transmitting torque between said inner and outer joint members, said rolling members being spherically shaped with the spherically shaped surfaces of adjacent said rolling members being disposed in supporting contact with one another, an axially extending shaft, said inner joint member contains an axially extending bore and said shaft is positioned within said bore, wherein the improvement comprises that said inner joint member is an annular member having an inner surface forming said bore and an outer surface, said shaft is secured to the inner surface forming the bore in said inner joint member for rotation therewith, said inner joint member is divided along a plane extending perpendicularly of the axis of said shaft into two similarly shaped inner joint member parts wherein the axial support of said inner joint member parts is provided by said shaft, said grooves have a circular shaped surface and said rolling members a correspondingly shaped surface so that said rolling members fit into said grooves, means for rigidly securing said inner joint member parts to said shaft for preventing axial movement of said inner joint member parts relative to said shaft, said inner joint member parts form, in combination, said openings and said openings have radially extending circular cylindrical sections with a diameter corresponding to the diameter of said rolling members with said rolling members fitted into said circular cylindrical sections, and said shaft having a circumferentially extending groove in the surface thereof defining the radially inner ends of said openings with said rolling members being in surface contact with said groove in said shaft and with said grooves in said outer joint member.

* * * * *